US008707224B2

(12) United States Patent
Peralta et al.

(10) Patent No.: US 8,707,224 B2
(45) Date of Patent: Apr. 22, 2014

(54) METHOD OF OPTIMIZING COMBINATIONAL CIRCUITS

(75) Inventors: Rene Caupolican Peralta, Gaithersburg, MD (US); Joan Boyar, Odense N (DK)

(73) Assignees: The United States of America, as Represented by the Secretary of Commerce, The National Institute of Standards & Technology, Washington, DC (US); University of Southern Denmark, Odense M (DK)

( * ) Notice: Subject to any disclaimer, the term of this patent is extended or adjusted under 35 U.S.C. 154(b) by 0 days.

(21) Appl. No.: 13/615,795

(22) Filed: Sep. 14, 2012

(65) Prior Publication Data
US 2013/0007086 A1     Jan. 3, 2013

Related U.S. Application Data

(62) Division of application No. 12/367,660, filed on Feb. 9, 2009, now Pat. No. 8,316,338.

(51) Int. Cl.
*G06F 17/50*     (2006.01)

(52) U.S. Cl.
USPC ........... 716/101; 716/102; 716/103; 716/132; 380/29; 380/37; 380/43

(58) Field of Classification Search
USPC ......... 716/101, 102, 103, 132; 380/29, 37, 43
See application file for complete search history.

(56) References Cited

U.S. PATENT DOCUMENTS

| 4,816,999 A | * | 3/1989 | Berman et al. | 716/54 |
| 5,189,629 A | * | 2/1993 | Kohnen | 716/101 |
| 5,282,147 A | * | 1/1994 | Goetz et al. | 716/103 |
| 5,473,547 A | | 12/1995 | Muroga | |
| 5,619,418 A | * | 4/1997 | Blaauw et al. | 716/113 |
| 5,721,690 A | * | 2/1998 | Asaka | 716/102 |

(Continued)

FOREIGN PATENT DOCUMENTS

| EP | 1292067 | 3/2003 |
| EP | 1465365 | 10/2004 |
| WO | 2004014016 | 2/2004 |
| WO | 2004102870 | 11/2004 |

OTHER PUBLICATIONS

Sumio Morioka and Akashi Satoh. "An Optimized S-Box Circuit Architecture for Low Power AES Design." In CHES2002, vol. 2523 of Lecture Notes in Computer Science. pp. 172-186. Springer, 2003.

(Continued)

*Primary Examiner* — Nha Nguyen
*Assistant Examiner* — Brian Ngo
(74) *Attorney, Agent, or Firm* — Carlson, Gaskey & Olds, P.C.

(57) ABSTRACT

A method of simplifying a combinational circuit establishes an initial combinational circuit operable to calculate a set of target signals. A quantity of multiplication operations performed in a first portion of the initial combinational circuit is reduced to create a first, simplified combinational circuit. The first portion includes only multiplication operations and addition operations. A quantity of addition operations performed in a second portion of the first, simplified combinational circuit is reduced to create a second, simplified combinational circuit. The second portion includes only addition operations. Also, the second, simplified combinational circuit is operable to calculate the target signals using fewer operations than the initial combinational circuit.

9 Claims, 7 Drawing Sheets

(56) References Cited

U.S. PATENT DOCUMENTS

| | | | | |
|---|---|---|---|---|
| 6,006,023 | A * | 12/1999 | Higashida | 716/104 |
| 7,010,763 | B2 * | 3/2006 | Hathaway et al. | 716/132 |
| 7,106,860 | B1 | 9/2006 | Yu et al. | |
| 7,257,229 | B1 | 8/2007 | Leshem | |
| 7,340,694 | B2 * | 3/2008 | Baumgartner et al. | 716/103 |
| 7,346,862 | B2 * | 3/2008 | Zhuang | 716/102 |
| 7,676,778 | B2 | 3/2010 | Arbel et al. | |
| 2003/0053623 | A1 * | 3/2003 | McCanny et al. | 380/37 |
| 2003/0068036 | A1 * | 4/2003 | Macchetti et al. | 380/29 |
| 2003/0198345 | A1 * | 10/2003 | Van Buer | 380/43 |
| 2006/0093136 | A1 | 5/2006 | Zhang et al. | |
| 2008/0092091 | A1 * | 4/2008 | Baumgartner et al. | 716/2 |
| 2008/0256274 | A1 | 10/2008 | Wohl et al. | |

OTHER PUBLICATIONS

Francois-Xavier Standaert, Gael Rouvroy, Jean-Jacques Quisquater, and Jean-Didier Legat. "Efficient Implementation of Rijndael Encryption in Reconfigurable Hardware: Improvement and Design Tradeoffs." UCL Crypto Group, Belgium, (2003).

Atri Rudra, Pradeep K. Dubey, Charanjit S. Jutla, Vijay Kumar, Josyula R. Rao, and Pankaj Rohatgi. "Efficient Implementation of Rijndael Encryption with Composite Field Arithmetic." In CHES2001, vol. 2162 of Lecture Notes in Computer Science, pp. 171-184. Springer, 2001.

D. Canright. "A Very Compact S-Box for AES." Workshop on Cryptographic Hardware and Embedded Systems (CHES2005), Lecture Notes in Computer Science 3659, pp. 441-455, Springer-Verlag, (2005).

D. Canright. "Masking a Compact AES S-Box." Naval Postgraduate School Technical Report: NPS-MA-07-002. (2007).

Liu Zhenglin, Zeng Yonghong, Zou Xuecheng, and Lei Jianming. "A Low-Power and Compact AES S-Box IP in 0.25um CMOS for Wireless Sensor Network." Mechatronics and Automation, 2007. ICMA 2007, Intenrational Conference on Volume, Issue, Aug. 5-8, 2007 pp. 723-728. Digital Object Identifier. 10.1109/ICMA.2007.4303633.

Nele Mentens, Lejla Batina, Bart Preneel, and Ingid Verbauwhede. "A Systematic Evaluation of Compact Hardware Implementations for the Rijndael S-Box." A.J. Menezes (Ed.): CT-RSA 2005, LNCS 3376, pp. 323-333, 2005. Springer-Verlag Berlin Heidelberg 2005.

Sumio Morioka and Akashi Satoh. "A 10-Gbps Full-AES Crypto Design with a Twisted BDD S-Box Architecture." IEEE Transactions on Very Large Scale Integration (VLSI) Systems vol. 12, Issue 7, Jul. 2004 pp. 686-691. Year of Publication: 2004—ISSN:1063-8210.

Namin Yu and Howard M. Heys. "A Compact Asic Implementation of the Advanced Encryption Standard with Concurrent Error Detection." Electrical and Computer Engineering, Memorial University of Newfoundland, Canada, 2007.

Joan Boyar and Rene Peralta. "Tight Bounds for the Multiplicative Complexity of Symmetric Functions." Theoretical Computer Science, 396 (1-3): 223-246, 2008.

Joan Boyar, Philip Matthews, and Rene Peralta. "On the Shortest Linear Straight-Line Program for Computing Linear Forms." In MFCS, pp. 168-179. 2008.

D. Canright. "A Very Compact Rijndael S-Box." Technical Report NPS-MA-05-001, Naval Postgraduate School, 2005.

Toshiya Itoh and Shigeo Tsujii. "A Fast Algorithm for Computing Multiplicative Inverses in GF (2m) Using Normal Bases." Information and Computation 78 (3): 171-177, 1998.

Christof Paar. "Some Remarks on Efficient Inversion in Finite Fields." In 1995 IEEE International Symposium on Information Theory, Whistler, B.C. Canada.

Christof Paar. "Optimized Arithmetic for Reed-Solomon Encoders." In IEEE International Symposium on Information Theory, p. 250. 1997.

Akashi Satoh, Sumio Morioka, Kohji Takano, and Seiji Munetoh. "A Compact Rijndael Hardware Architecture with S-Box Optimization." C. Boyd (Ed.) Advanced in Cryptology—Proceedings of ASIACRYPT 01, vol. 2248 of Lecture Notes in Computer Science, pp. 239-254. Springer-Verlag, 2001.

Pawel Chodowiec and Kris Gaj. "Very Compact FPGA Implementation of the AES Algorithm." In C.D. Walter et al., editor, CHES2003, vol. 2779 of Lecture Notes in Computer Science, pp. 319-333. Springer, 2003.

Johannes Wolkerstorfer, Elisabeth Oswald, and Mario Lamberger. "An Asic Implementation of the AES SBoxes." In CT-RSA, vol. 2271 of Lecture Notes in Computer Science, pp. 67-78. Springer, 2002.

\* cited by examiner

METHOD OF OPTIMIZING COMBINATIONAL CIRCUITS

REFERENCE TO RELATED APPLICATIONS

This application is a divisional of U.S. application Ser. No. 12/367,660 filed on Feb. 9, 2009 now U.S. Pat. No. 8,316,338.

BACKGROUND OF THE INVENTION

This disclosure relates to combinational circuits, and more specifically to a method of optimizing combinational circuits.

Combinational circuits have many possible applications. One such application is computing an inverse in a Galois Field, which is a field containing a finite number of elements. A combinational circuit is a circuit having an output value determined by the values of its inputs. Combinational circuits can be represented as circuit schematics using Boolean logic gates (such as AND gates and XOR gates), or can be represented mathematically using formulas having operations corresponding to logic gates. For example, an AND gate corresponds to a field multiplication operation, and an XOR gate corresponds to a field addition operation. Logic gates can be arranged to calculate functions, and binary string output of a function may be referred to as a "target signal." In a typical truth table for a function, the target signal corresponding to the function is the last column of the truth table.

A combinational circuit may have both linear and non-linear portions, where the "non-linear" portions contain AND gates and XOR gates, and the "linear" portions contain only XOR gates. A quantity of AND gates of a combinational circuit may be referred to as the "multiplicative complexity" of the circuit. Combinational circuits and their associated formulas can be extremely large and complex in certain applications, such as microprocessors.

SUMMARY OF THE INVENTION

A method of simplifying a combinational circuit establishes an initial combinational circuit operable to calculate a target signal. A quantity of multiplication operations performed in a first portion of the initial combinational circuit is reduced to create a first, simplified combinational circuit. The first portion includes only multiplication operations and addition operations. A quantity of addition operations performed in a second portion of the first, simplified combinational circuit is reduced to create a second, simplified combinational circuit. The second portion includes only addition operations. Also, the second, simplified combinational circuit is operable to calculate the target signal using fewer operations than the initial combinational circuit.

A computer-implemented method of simplifying a plurality of formulas establishes a plurality of formulas. The formulas include only addition operations, and the formulas correspond to a portion of a combinational circuit including only addition operations. A basis set including a plurality of input signals is defined. Using a computer, a distance vector is determined that includes one value for each of the plurality of formulas, the one value corresponding to a number of addition operations necessary to calculate a corresponding formula using signals from the basis set. Using the computer, two basis vectors are determined whose sum, when added to the distance vector, reduces at least one value in the distance vector, and the sum is added to the basis set. The steps of determining two basis vectors whose sum, when added to the basis set, reduces at least one value in the distance vector, and adding the sum to the basis set may be selectively repeated until the basis set includes sums corresponding to each of the plurality of formulas.

A combinational circuit for a Substitution-Box for the Advanced Encryption Standard having a total of 115 Boolean gates comprises a first, input portion, a second portion coupled to the first, input portion, and a third, output portion coupled to the second portion. The first, input portion has 23 XOR gates. The second portion has 30 XOR gate and 32 AND gates, and computes the non-linear component of inversion in GF(256). Also, in the second portion 11 of the 30 XOR gates and 5 of the 32 AND gates are operable to perform inversion in GF(16). The third, output portion has 26 XOR gates and 4 XNOR gates.

These and other features of the present invention can be best understood from the following specification and drawings, of which the following is a brief description.

DETAILED DESCRIPTION OF THE PREFERRED EMBODIMENT

Figure 1:
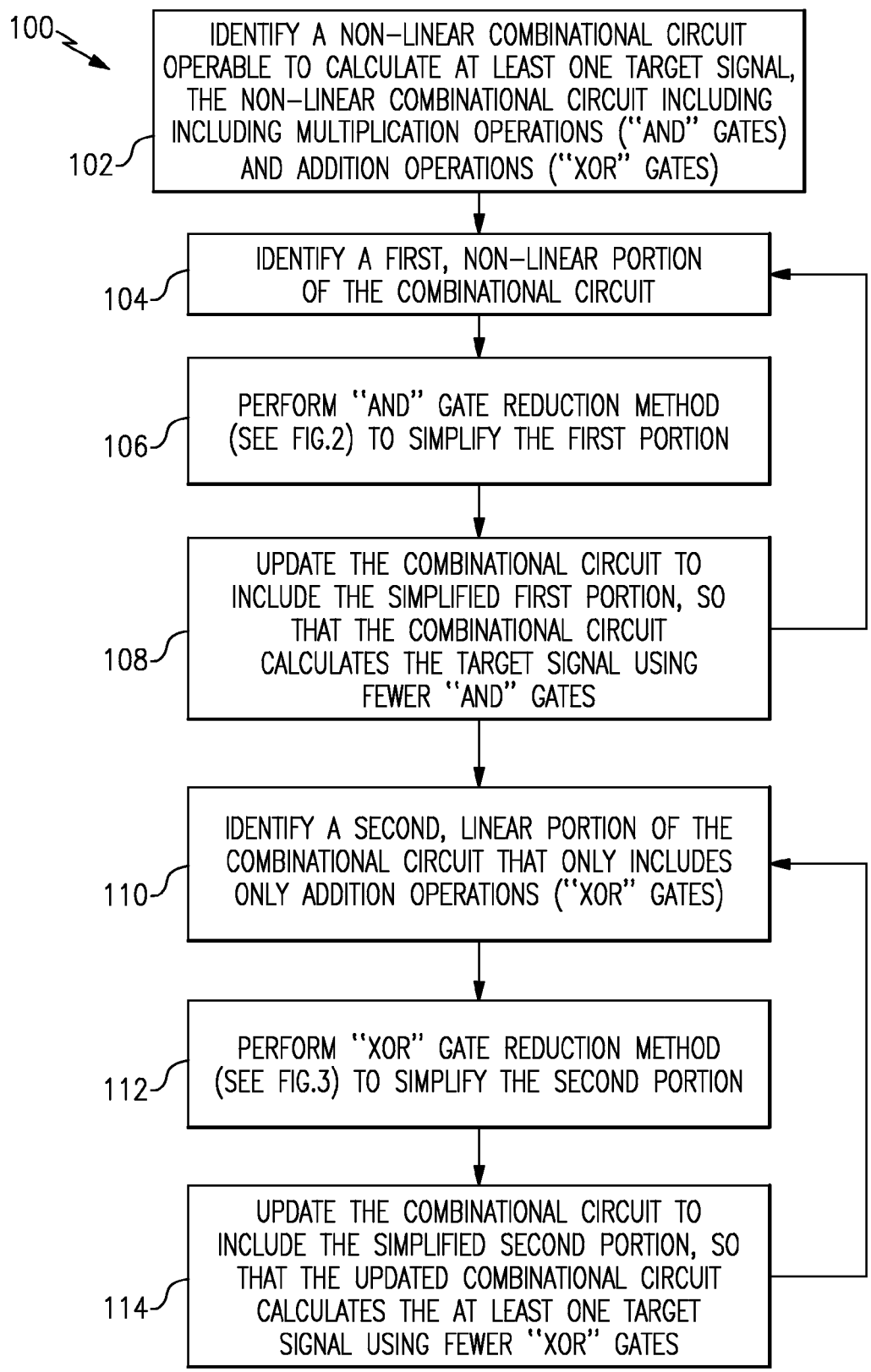
FIG. 1 schematically illustrates a method of optimizing a combinational circuit.

FIG. 1 schematically illustrates a method 100 of optimizing a combinational circuit. A non-linear combinational circuit operable to calculate a target signal is identified (step 102). As described above, the term "non-linear" refers to a circuit that includes multiplication operations (AND gates) and addition operations (XOR gates). The non-linear combinational circuit includes linear portions that include only addition operations (XOR gates). It is known that the set comprised of an AND gate, an XOR gate, and a constant "1" is functionally complete. That is, any other logic gate (such as an OR gate or a NAND gate) can be represented using only AND gates, XOR gates, and the constant "1". In one example step 102 includes converting a circuit including gates other than AND gates and XOR gates into AND gates and XOR gates. One of ordinary skill in the art would be able to perform such a conversion. In one example step 102 includes extracting a combinational circuit from a function.

A first, non-linear portion of the combinational circuit is identified (step 104). A method 200 (see FIG. 2) of reducing a quantity of multiplication operations is performed (step 106), and the combinational circuit is updated (step 108). Steps 104-108 may be selectively repeated to simplify multiple portions of the combinational circuit.

A second, linear portion of the combinational circuit is identified (step 110) that includes only addition operations (XOR gates). A method 300 (see FIG. 3) of reducing a quantity of addition operations is performed (step 112), and the combinational circuit is updated (step 114) to form a simplified combinational circuit that is operable to calculate the same target signal as the original combinational circuit using fewer operations.

Figure 2:
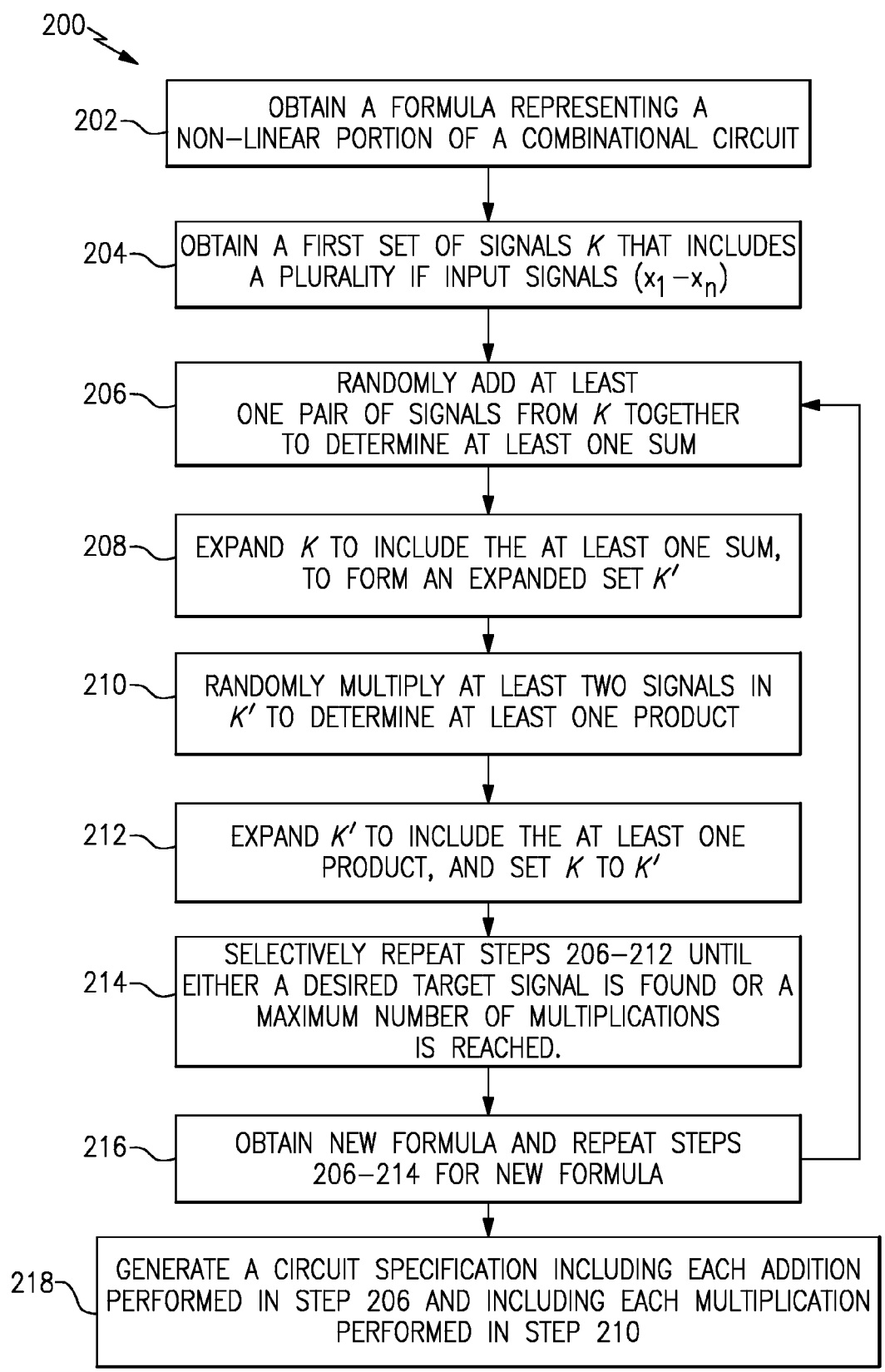
FIG. 2 schematically illustrates a method of reducing a quantity of AND gates in a combinational circuit.

FIG. 2 schematically illustrates the method 200 of reducing a quantity of multiplication operations (AND gates) in greater detail. The method 200 will be illustrated using formulas 1-4 below which are derived from a GF ($2^4$) Galois Field representation from Canright (D. Canright. *A Very Compact Rijndael S-box*. Technical Report NPS-MA-05-001, Naval Postgraduate School, 2005). Thus, for this example we will assume that formulas 1-4 correspond to the first portion of a combinational circuit. However, it is understood that method 200 may also be applied to formulas other than formulas 1-4, including formulas having a greater or lesser quantity of variables and operations.)

$$y = x_2 x_3 x_4 + x_1 x_3 + x_2 x_3 + x_3 + x_4 \quad \text{formula \#1}$$

$$y_2 = x_1 x_3 x_4 + x_1 x_3 + x_2 x_3 + x_2 x_4 + x_4 \quad \text{formula \#2}$$

$$y_3 = x_1 x_2 x_4 + x_1 x_3 + x_1 x_4 + x_1 + x_2 \quad \text{formula \#3}$$

$$y_4 = x_1 x_2 x_3 + x_1 x_3 + x_1 x_4 + x_2 x_4 + x_2 \quad \text{formula \#4}$$

Formulas 5-8, shown below, show four example inputs $x_1$-$x_4$ that may be used with formulas 1-4.

$$x_1 = 0000000011111111 \quad \text{formula \#5}$$

$$x_2 = 0000111100001111 \quad \text{formula \#6}$$

$$x_3 = 0011001100110011 \quad \text{formula \#7}$$

$$x_4 = 0101010101010101 \quad \text{formula \#8}$$

Inputting the values for $x_1$-$x_4$ shown in formulas 5-8 into formulas 1-4 yields the values for signals $y_1$-$y_4$ shown in formulas 9-12 below.

$$y_1 = 0110010001010111 \quad \text{formula \#9}$$

$$y_2 = 0101001101110001 \quad \text{formula \#10}$$

$$y_3 = 0000111110010011 \quad \text{formula \#11}$$

$$y_4 = 0000101001101111 \quad \text{formula \#12}$$

If one calculated formulas 1-4 separately, starting from scratch each time, 18 multiplications (AND operations) and 16 additions (XOR operations) would be required. This would be inefficient because certain terms such as $x_1 x_3$ and $x_1 x_4$ appear more than once, and recalculating those terms would be a waste of resources, whether those resources were computer processor calculations or wasted space occupied by excess logic gates in a circuit.

The method 200 may be used to simplify formulas 1-4 and reduce a quantity of multiplications (AND operations) performed in formulas 1-4. In one example, the method 200 could be first applied to formula 4 for $y_4$. The initial formula 4 for $y_4$ (reproduced below) uses 5 multiplications and 4 additions. However it can be seen that formula 4 can be simplified by factoring out $x_1 x_3$ from the first two terms as shown in formula 13 below, which only requires 3 multiplications and 4 additions (a reduction of 1 multiplication). The question then becomes whether $y_4$ can be processed using less than 3 multiplications.

$$y_4 = x_1 x_2 x_3 + x_1 x_3 + x_1 x_4 + x_2 x_4 + x_2 \quad \text{formula \#4}$$

$$y_4 = (x_1 x_3)(x_2 + 1) + (x_1 + x_2) x_4 + x_2 \quad \text{formula \#13}$$

To apply the method 200 to $y_4$, a polynomial (formula) to be simplified is obtained (step 202), which in this case will be formula 4 for $y_4$. The formula is representative of one output of a non-linear portion of the combinational circuit.

A set K of known input signals $x_1$-$x_4$ is obtained (step 204). Pairs of the input signals $x_1$-$x_4$ are added together to determine at least one sum using a computer (step 206), and K is expanded to include the sums (step 208) forming an expanded set K'. Because step 208 involves randomly chosen sums, the signals in K' at this point do not require any additional multiplications. Signals in the set K' are then multiplied to determine at least one product using the computer (step 210), and K' is expanded to include the at least one product (step 212). Steps 210-212 yield signals that require at most one more multiplication than the original set of known signals. Steps 206-212 are then selectively repeated (step 214) until either a desired target signal is found, or a maximum number of multiplications is reached (which in the case of formula 4 this is 3 multiplications). A new formula may then be obtained (step 216) and steps 206-214 may be selectively repeated for the new formula.

For $y_4$ the method 200 can yield the following simplified formula:

$$y_4 = (x_1 + x_2)(x_4 + x_1 x_3) + x_2 \quad \text{formula \#14}$$

A circuit specification is then generated (step 218) including each addition performed in step 206 and each multiplication performed in step 210, as shown above in formula 14. In one example, step 218 may include creating a set of short equations, or "straight line program," as shown in formulas 15-19 shown below. Although the term "straight line program" is used throughout this application, it is understood that a straight line program is just one type of a circuit specification. It is understood that other types of circuit specifications could be used, such as Verilog code.

$$t_1 = x_1 + x_2 \quad \text{formula \#15}$$

$$t_2 = x_1 \cdot x_3 \quad \text{formula \#16}$$

$$t_3 = x_4 + t_2 \quad \text{formula \#17}$$

$$t_4 = t_1 \cdot t_3 \quad \text{formula \#18}$$

$$y_4 = x_2 + t_4 \quad \text{formula \#19}$$

The improved formula 14 for $y_4$ requires only 2 multiplications and 3 additions, instead of 3 multiplications and 4 additions as shown in formula 13. Thus, although inputting the values of inputs $x_1$-$x_4$ into formula 4, formula 13 or formula 30 will yield the same result for $y_4$, formula 14 is the most efficient way to achieve this result. As described above, we know that it is not possible to compute $y_4$ using fewer than 2 multiplications, so once formula 14 is determined (which uses two multiplications) step 116 is complete with regards to $y_4$.

The method 200 may then be applied to formula 2 for $y_2$. Looking at formula 2 for $y_2$ (reproduced below) we see that formula 2 has a degree, or $\delta$, of 3 (step 104). So if we can compute $y_2$ using two multiplications the method 100 has succeeded.

$$y_2 = x_1 x_3 x_4 + x_1 x_3 + x_2 x_3 + x_2 x_4 + x_4 \quad \text{formula \#2}$$

At this point the expanded set known signals K' (step 204) would be as follows:

$$K' = \{x_1, x_2, x_3, x_4, t_1, t_2, t_3, t_4, y_4\} \quad \text{formula \#20}$$

Represented in binary notation the new signals are as follows:

$$t_1 = 0000111111110000 \quad \text{formula \#21}$$

$$t_2 = 0000000000110011 \quad \text{formula \#22}$$

$t_3 = 0101010101100110$  formula #23

$t_4 = 0000010101100000$  formula #24

Performing steps 206-212 for formula 2 yields the following formula for $y_2$ that only requires two multiplications:

$y_2 = x_4 + (x_2 + x_1 x_3)(x_3 + x_4)$  formula #25

These steps may be repeated to obtain simplified versions of $y_3$ and $y_4$ as shown in the straight line program of formulas 26-41 below.

$t_1 = x_1 + x_2$  formula #26

$t_2 = x_1 \cdot x_3$  formula #27

$t_3 = x_4 + t_2$  formula #28

$t_4 = t_1 \cdot t_3$  formula #29

$y_4 = x_2 + t_4$  formula #30

$t_5 = x_3 + x_4$  formula #31

$t_6 = x_2 + t_2$  formula #32

$t_7 = t_6 \cdot t_5$  formula #33

$y_2 = x_4 + t_7$  formula #34

$t_8 = x_3 + y_2$  formula #35

$t_9 = t_3 + y_2$  formula #36

$t_{10} = x_4 \cdot t_9$  formula #37

$y_1 = t_{10} + t_8$  formula #38

$t_{11} = t_3 + t_{10}$  formula #39

$t_{12} = y_4 \cdot t_{11}$  formula #40

$y_3 = t_{12} + t_1$  formula #41

As described above, if one used formulas 1-4 for calculating $y_1$-$y_4$ separately, 18 multiplications (AND operations) and 16 additions (XOR operations) would be required. However, using the straight line program for calculating $y_1$-$y_4$ shown in formulas 26-41, only 5 multiplications and 11 additions are required. So, in the example of formulas 1-4 applying method 200 can yield a reduction of 13 multiplications and 5 additions.

Figure 3:
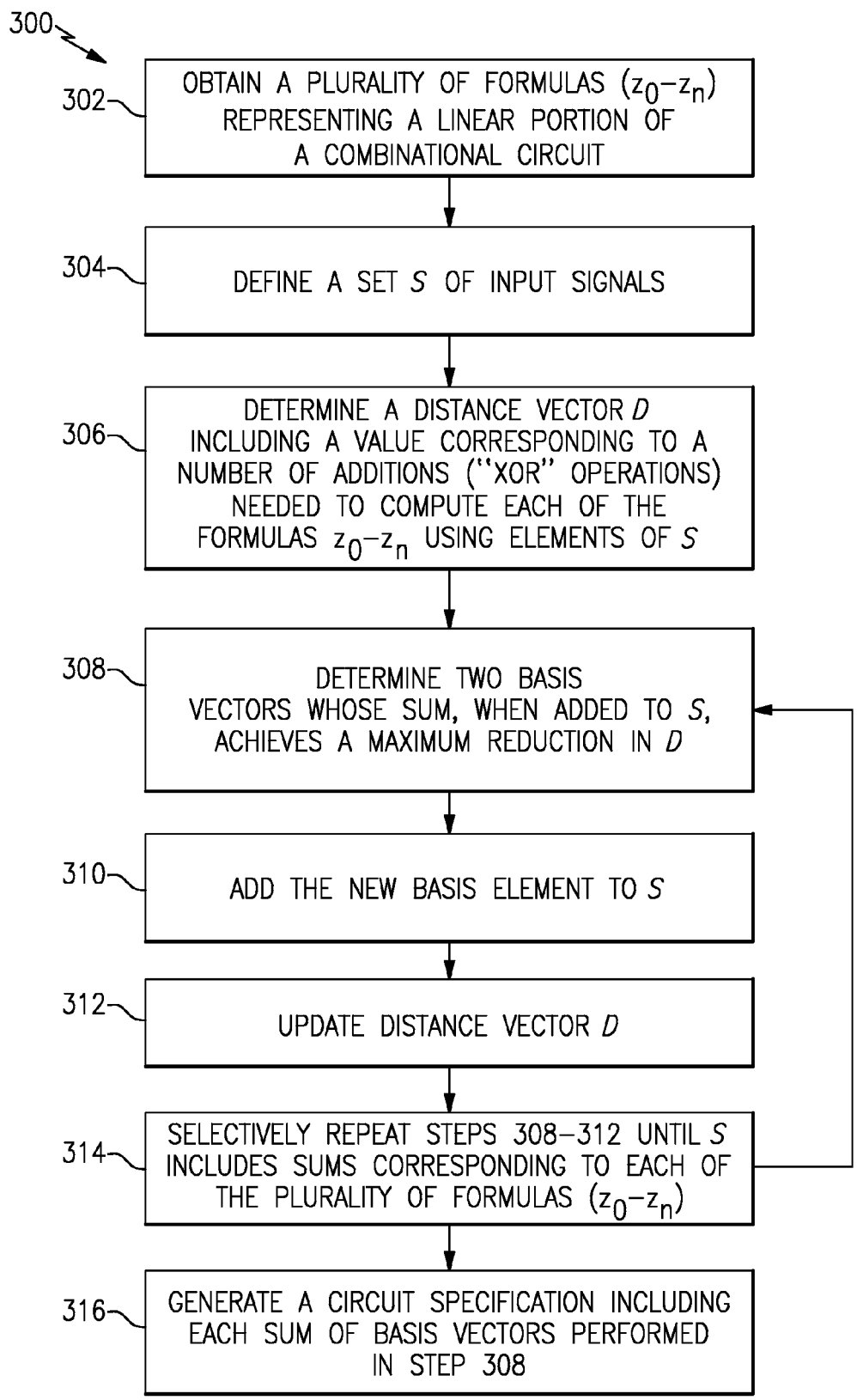
FIG. 3 schematically illustrates a method of reducing a quantity of XOR gates in a combinational circuit.

FIG. 3 schematically illustrates the method 300 of reducing a quantity of XOR gates in greater detail. As described above, the method 300 is applied to a second portion of a combinational circuit that contains only XOR gates, also known as a linear portion of the combinational circuit. Suppose a linear portion of the combinational circuit can be represented by formulas 42-47 as shown below (step 302):

$z_0 = w_0 + w_1 + w_2$  formula #42

$z_1 = w_1 + w_3 + w_4$  formula #43

$z_2 = w_0 + w_2 + w_3 + w_4$  formula #44

$z_3 = w_1 + w_2 + w_3$  formula #45

$z_4 = w_0 + w_1 + w_3$  formula #46

$z_5 = w_2 + w_3 + w_4$  formula #47

Formulas 42-47 for $z_0$-$z_5$ can also be represented in the form of matrix M shown in formula 48 (shown below), with each row of M representing one of the formulas for $z_0$-$z_5$. For example, the first row of M corresponds to $z_0$, and includes a "1" for each of $w_0$, $w_1$ and $w_2$ (which are all included in formula 42) and a "0" for each of $w_3$ and $w_4$ (neither of which are present in formula 42).

$$M = \begin{bmatrix} 1 & 1 & 1 & 0 & 0 \\ 0 & 1 & 0 & 1 & 1 \\ 1 & 0 & 1 & 1 & 1 \\ 0 & 1 & 1 & 1 & 0 \\ 1 & 1 & 0 & 1 & 0 \\ 0 & 1 & 1 & 1 & 1 \end{bmatrix}$$  formula #48

If each of formulas $z_0$-$z_5$ were calculated separately from scratch, 14 additions (XOR operations) would be required. One may apply the method 300 to the matrix M to see if a simplified short line program to solve for $z_0$-$z_5$ using a reduced number of additions can be determined by using formula 49 below as a reference.

$f(w) = Mw$  formula #49 where M is the matrix of formula 48; and
w is a value in the input vector

An input vector S is shown below in formula 50 and includes the values shown in formulas 51-55. The vector S acts as a set of signals to serve as a basis for the method 200 (step 304). As shown in formulas 51-55, each of the values $w_0$-$w_4$ is a row of an identity matrix.

$S = \{w_0, w_1, w_2, w_3, w_4\}$  formula #50

$w_0 = 10000$  formula #51

$w_1 = 01000$  formula #52

$w_2 = 00100$  formula #53

$w_3 = 00010$  formula #54

$w_4 = 00001$  formula #55

The following distance vector is then determined (step 306), as shown in formula 56:

$D = [2\ 2\ 3\ 2\ 2\ 3]$  formula #56

Each value in the distance vector D corresponds to a quantity of additions needed to compute a $z_n$ value. For example, computing $z_0$ requires 2 additions, computing $z_1$ requires 2 additions, computing $z_2$ requires 3 additions, etc.

Two basis vectors are then chosen (step 308) whose sum, when added to the basis D minimizes the sum of the new distances. In one example $w_1 + w_3$ may be selected, as shown in formula 57 below. The sum is then added to the input vector S to form $S_{updated}$ (step 310) as shown in formula 58 below.

$t_{100} = w_1 + w_3$  formula #57

$w_1 + w_3 = [0\ 1\ 0\ 1\ 0]$  formula #58

$S_{updated} = \{w_0, w_1, w_2, w_3, w_4, t_{100}\}$  formula #59

As shown in formulas 42-47, formulas $w_1$, $w_3$ and $w_4$ all include the term $w_1 + w_3$, which can now be replaced by $t_{100}$ reducing the number of additions required to determine $w_1$, $w_3$ and $w_4$ by one, and thus also reducing corresponding distance vector D to form an updated distance vector D updated (step 312) as shown in formula 60 below:

$D_{updated} = [2\ 1\ 3\ 1\ 1\ 2]$  formula #60

Steps 308-312 may then be repeated until the distance vector D is minimized, if possible to include all zeros, as shown by formulas 61-87 below.

$$t_{101} = w_0 + t_{100} \qquad \text{formula \#61}$$

$$w_0 + t_{100} = [1\ 1\ 0\ 1\ 0] \qquad \text{formula \#62}$$

$$[1\ 1\ 0\ 1\ 0] = z_4 \qquad \text{formula \#63}$$

$$D_{updated} = [2\ 1\ 3\ 1\ 0\ 2] \qquad \text{formula \#64}$$

At this point we have found signal $z_4$, so the sums of formulas 57 and 61 are saved in a straight line program.

$$t_{102} = w_2 + t_{100} \qquad \text{formula \#65}$$

$$w_2 + t_{100} = [0\ 1\ 1\ 1\ 0] \qquad \text{formula \#66}$$

$$[0\ 1\ 1\ 1\ 0] = z_3 \qquad \text{formula \#67}$$

$$D_{updated} = [2\ 1\ 3\ 0\ 0\ 1] \qquad \text{formula \#68}$$

At this point we have found $z_3$, so formula 65 is added to the straight line program.

$$t_{103} = w_4 + t_{100} \qquad \text{formula \#69}$$

$$w_4 + t_{100} = [0\ 1\ 0\ 1\ 1] \qquad \text{formula \#70}$$

$$[0\ 1\ 0\ 1\ 1] = z_1 \qquad \text{formula \#71}$$

$$D_{updated} = [2\ 0\ 3\ 0\ 0\ 1] \qquad \text{formula \#72}$$

At this point we have found $z_1$, so formula 69 is added to the straight line program.

$$t_{104} = w_2 + t_{103} \qquad \text{formula \#73}$$

$$w_2 + t_{103} = [0\ 1\ 1\ 1\ 1] \qquad \text{formula \#74}$$

$$[0\ 1\ 1\ 1\ 1] = z_5 \qquad \text{formula \#75}$$

$$D_{updated} = [2\ 0\ 2\ 0\ 0\ 0] \qquad \text{formula \#76}$$

At this point we have found $z_5$, so formula 73 is added to the straight line program.

$$t_{105} = w_0 + w_1 \qquad \text{formula \#77}$$

$$w_0 + w_1 = [1\ 1\ 0\ 0\ 0] \qquad \text{formula \#78}$$

$$D_{updated} = [1\ 0\ 1\ 0\ 0\ 0] \qquad \text{formula \#79}$$

$$t_{106} = w_2 + t_{105} \qquad \text{formula \#80}$$

$$w_2 + t_{105} = 1\ 1\ 0\ 0\ 1 \qquad \text{formula \#81}$$

$$[1\ 1\ 1\ 0\ 0] = z_0 \qquad \text{formula \#82}$$

$$D_{updated} = [0\ 0\ 1\ 0\ 0\ 0] \qquad \text{formula \#83}$$

At this point we have found $z_0$, so formulas 77 and 80 are added to the straight line program.

$$t_{107} = t_{103} + t_{106} \qquad \text{formula \#84}$$

$$t_{103} + t_{106} = [1\ 0\ 1\ 1\ 1] \qquad \text{formula \#85}$$

$$[1\ 0\ 1\ 1\ 1] = z_2 \qquad \text{formula \#86}$$

$$D_{updated} = [0\ 0\ 0\ 0\ 0\ 0] \qquad \text{formula \#87}$$

At this point we have found $z_2$, so formula 84 is added to the straight line program. Also, since the distance vector $D_{updated}$ now includes only zeros we are finished. Notice that this last operation added [01111] and [11000], to obtain [10111], so there was a cancellation in the second entry, adding two ones to get a zero. This possibility makes this technique different from prior techniques. For example, under the PAAR algorithm, no cancellation of elements is allowed.

Combined together, here is the straight line program for computing $z_0$-$z_5$, which only requires 8 XOR operations, instead of the 14 XOR operations required if $z_0$-$z_5$ are calculated separately.

$$t_{100} = w_1 + w_3 \qquad \text{formula \#57}$$

$$t_{101} = w_0 + t_{100} \qquad \text{formula \#61}$$

$$t_{102} = w_2 + t_{100} \qquad \text{formula \#65}$$

$$t_{103} = w_4 + t_{100} \qquad \text{formula \#69}$$

$$t_{104} = w_2 + t_{103} \qquad \text{formula \#73}$$

$$t_{105} = w_0 + w_1 \qquad \text{formula \#77}$$

$$t_{106} = w_2 + t_{105} \qquad \text{formula \#80}$$

$$t_{107} = t_{103} + t_{106} \qquad \text{formula \#84}$$

In one example, if during step 308 there is a tie between multiple pairs of basis vectors (i.e. the sum of two sets of basis vectors achieves a reduction in D of the same magnitude), then the tie may be resolved by using one of a plurality of tie-breaking techniques that utilize a Euclidean norm of the updated distance vector. The Euclidean norm is calculated by calculating a square root of a sum of squares of elements of the updated distance vector.

In a first tie-breaking technique, a pair of basis vectors is selected whose sum induces the largest Euclidean norm in the new distance vector. For example, if a sum of a first pair of basis vectors resulted in a distance vector of [0 0 3 1] (which has a Euclidean norm of $\sqrt{0^2+0^2+3^2+1^2}=3.16$) and a sum of a second pair of basis vectors resulted in a distance vector of [1 1 1 1] (which has a Euclidean norm of $\sqrt{1^2+1^2+1^2+1^2}=2.00$) the first pair would be chosen because it induces a higher Euclidean norm. Of course, the step of actually calculating the square root could be omitted, as $3.16^2$ would still be greater than $2.00^2$.

In a second tie-breaking technique, a pair of basis vectors is selected who has the greatest value of a square of the Euclidean norm minus the largest element in the distance vectors.

In a third tie-breaking technique, a pair of basis vectors is selected who has the greatest value for a square of the Euclidean norm minus the difference between the largest two elements of the distance vector.

In a fourth tie-breaking technique, if a pair of basis vectors induces a Euclidean norm larger than a previous pair of basis vectors, then one of the pairs is randomly chosen (with a probability of ½).

Although the methods 200 and 300 have been described as applied to separate sets of formulas, it is understood that they could be applied to a single circuit or set of formulas. For example, method 200 could be applied to first with the aim of reducing non-linear components of a circuit while possibly extending linear components. Then method 300 could be applied to optimize the linear components. Also, it is understood that if the circuit contained multiple linear portions and multiple non-linear portions, the methods 200 and 300 could be applied to each of those portions to attempt to reduce the total number of gates in the circuit.

Figure 4:
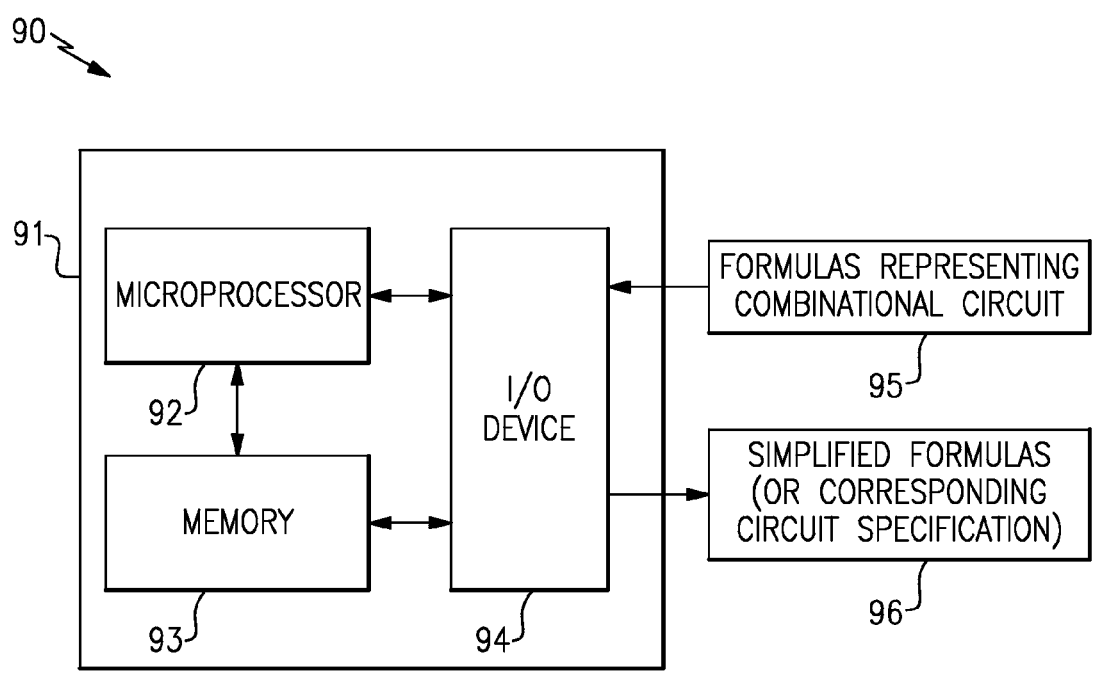
FIG. 4 schematically illustrates a system operable to implement the methods of FIGS. 2-3.

FIG. 4 schematically illustrates a system 90 operable to implement the methods 100, 200 and 300. A computer 91 includes a microprocessor 92, memory 93, and an input/ output device 94. The computer is operable to receive one or more formulas 95 representing a combinational circuit, is operable to apply the methods 100, 200, and 300 to the formulas 95, and is operable to output one or more simplified formulas 96 that calculate a same target signal as the formulas 95 using fewer gates.

Figure 5:
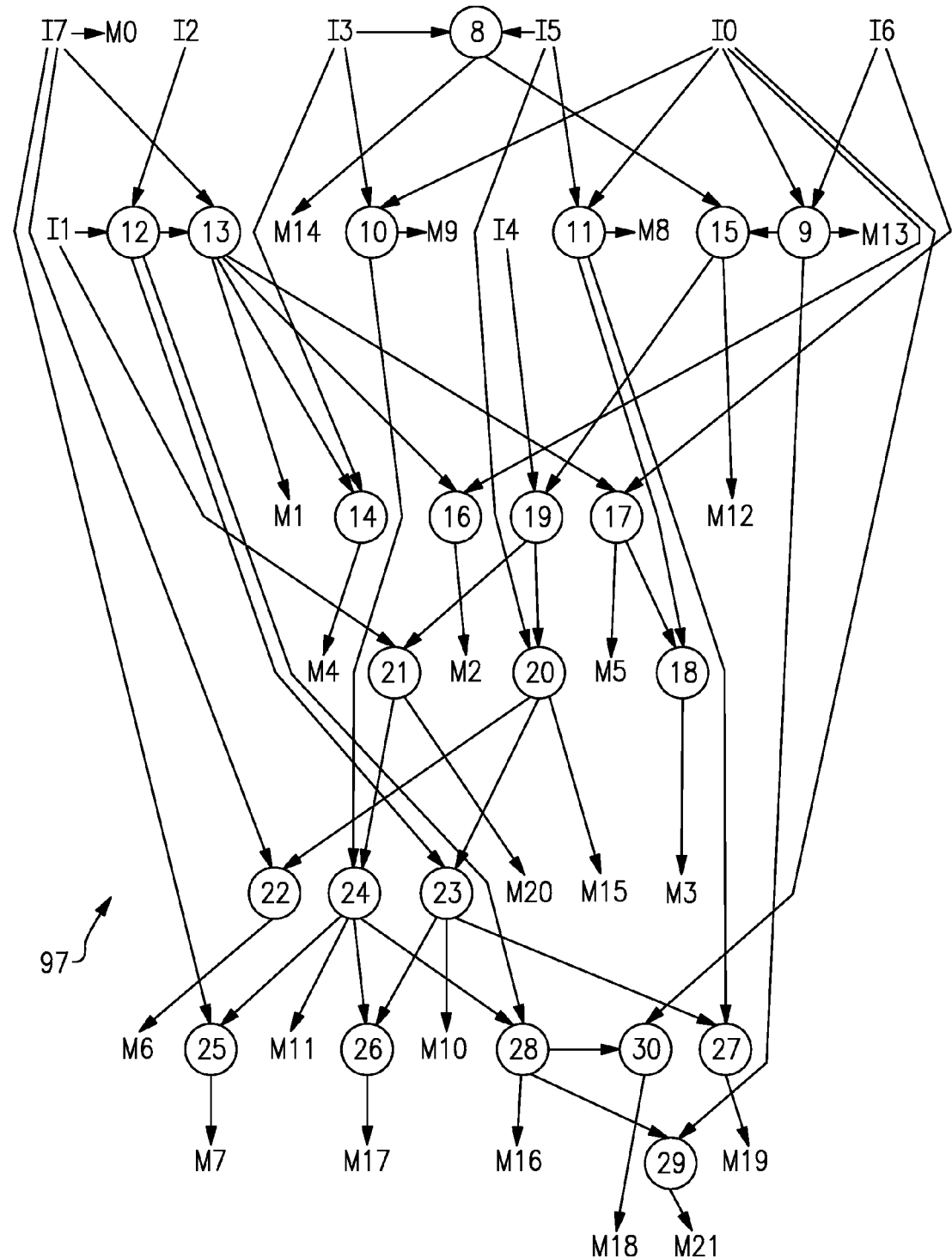
FIG. 5 schematically illustrates a first, input component of a S-Box for AES.
Figure 6:
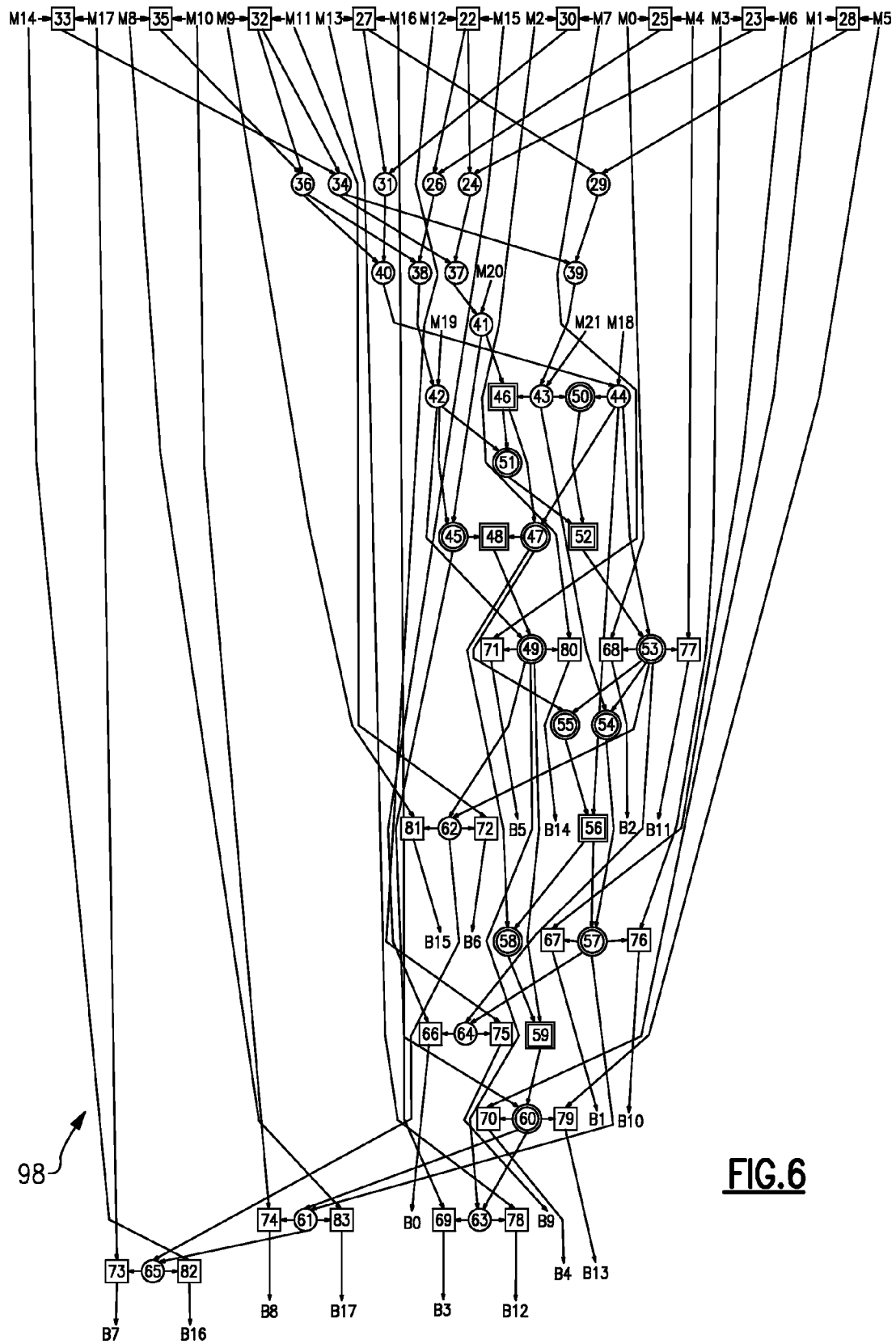
FIG. 6 schematically illustrates a second component of the S-Box for AES.
Figure 7:
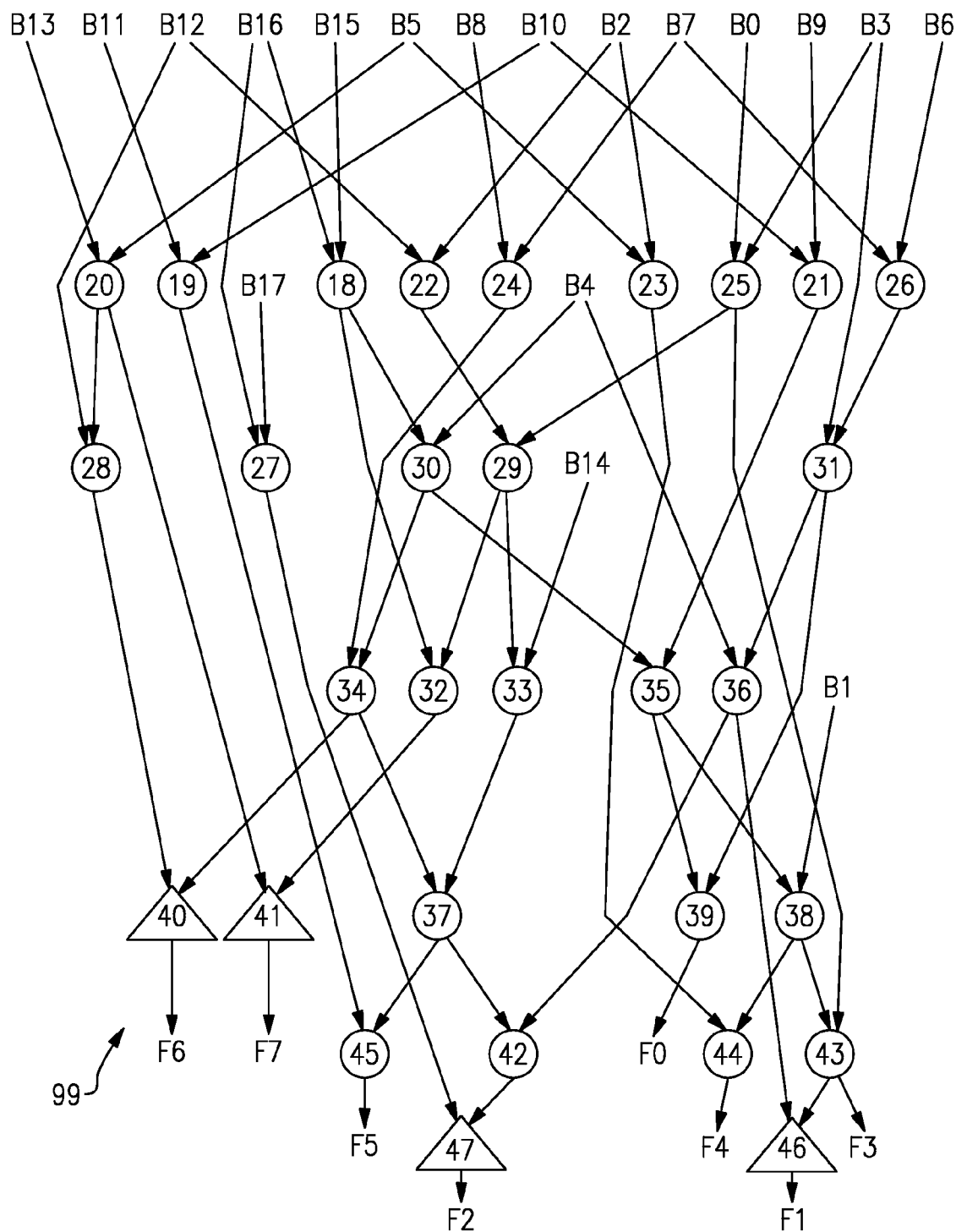
FIG. 7 schematically illustrates a third, output component of the S-Box for AES.

FIGS. 5-7 schematically illustrate a Substitution-Box ("S-Box") for the Advanced Encryption Standard ("AES") after the method 100 has been applied to the S-Box to simplify it. The simplified S-Box of FIGS. 5-7 includes only 115 Boolean logic gates. FIG. 5 schematically illustrates a first, input portion 97 that includes 23 XOR gates (circles). FIG. 6 schematically illustrates a second portion 98 coupled to the first, input portion 97. The second portion 98 includes 30 XOR gates (circles) and 32 AND gates (squares). Also, 11 of the 30 XOR gates and 5 of the 32 AND gates (double circles and double squares) are operable to perform inversion in GF(16). FIG. 7 schematically illustrates a third, output portion 99 coupled to the second portion 98. The third, output portion 99 includes 26 XOR gates (circles) and 4 XNOR gates (triangles). Also, the second portion 98 corresponds to a non-linear core of inversion in GF(256). The second portion 98 represents a core of inversion in GF(256) that could be combined with various linear subcircuits to achieve inversion in GF(256).

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A computer-implemented method of simplifying a plurality of formulas, comprising:
   a) establishing a plurality of formulas including only addition operations, wherein each of the plurality of formulas corresponds to a portion of a combinational circuit including only addition operations;
   b) defining a basis set including a plurality of input signals, wherein each of the input signals corresponds to a row from an identity matrix;
   c) determining, through use of a computer, a distance vector that includes one value for each of the plurality of formulas, the one value corresponding to a number of addition operations necessary to calculate a corresponding formula using signals from the basis set;
   d) determining, through use of the computer, two basis vectors from the basis set whose sum, when added to the distance vector, reduces at least one value in the distance vector;
   e) adding the sum to the basis set; and
   f) selectively repeating steps C-E until the basis set includes sums corresponding to each of the plurality of formulas.

2. The method of claim 1, further comprising:
generating a circuit specification including the each sum of said two basis vectors from step D.

3. The method of claim 2, wherein the circuit specification corresponds to at least one of a straight line program or Verilog code.

4. The method of claim 2, further comprising:
constructing a combinational circuit corresponding to the circuit specification.

5. The method of claim 1, wherein said step D selects two basis vectors whose sum achieve a maximum reduction in the distance vector.

6. The method of claim 5, wherein if two different sums achieve the same maximum reduction in the distance vector, the sum is chosen who includes the largest Euclidean norm.

7. The method of claim 5, wherein if two different sums achieve the same maximum reduction in the distance vector, the sum is chosen who has the greatest value of the Euclidean norm minus the largest element in the distance vector.

8. The method of claim 5, wherein if two different sums achieve the same maximum reduction in the distance vector, the sum is chosen who induces the greatest value for a square of the Euclidean norm minus a difference between the largest two elements of the distance vector.

9. The method of claim 5, wherein if two different sums achieve the same maximum reduction in the distance vector and the two sums each induce different Euclidean norms, one of the two different sums is randomly chosen.

* * * * *